Nov. 4, 1952
F. J. MAZUR
2,616,335
MOUNTING FOR REARVIEW MIRRORS
Filed Nov. 26, 1947
2 SHEETS—SHEET 1
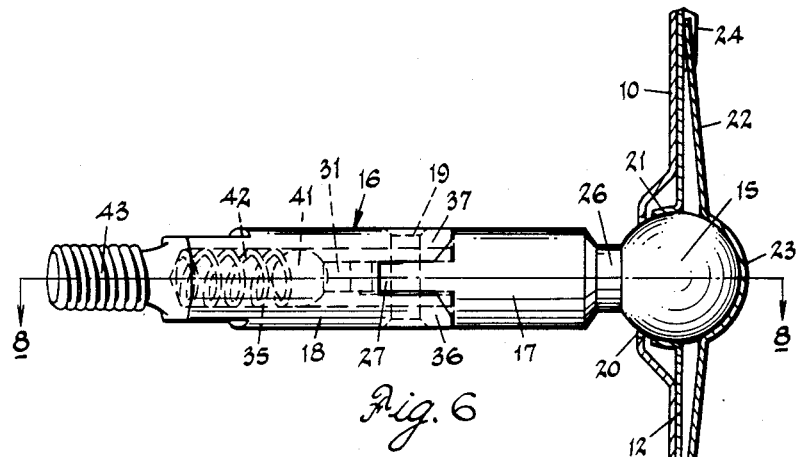
Fig. 6
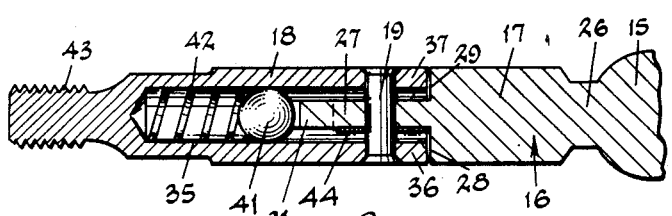
Fig. 7
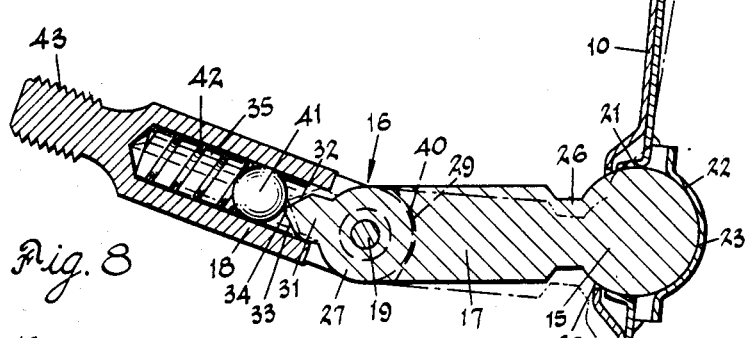
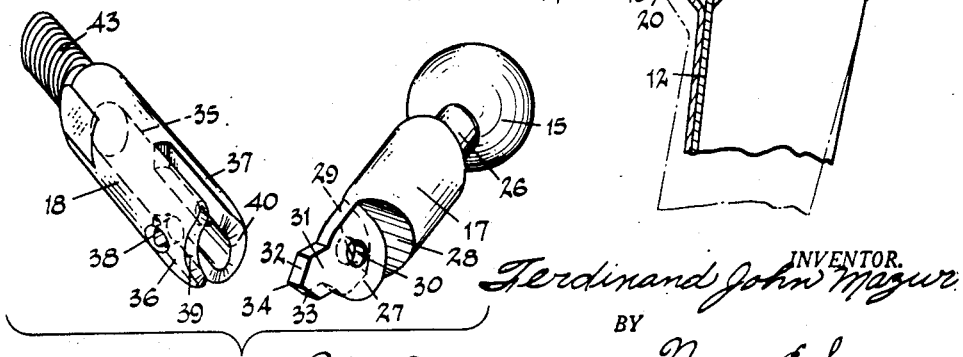
Fig. 9
INVENTOR.
Ferdinand John Mazur
BY
Nobbe & Swope
ATTORNEYS Nov. 4, 1952 F. J. MAZUR 2,616,335
MOUNTING FOR REARVIEW MIRRORS
Filed Nov. 26, 1947 2 SHEETS—SHEET 2

INVENTOR.
Ferdinand John Mazur
BY
Nobbe & Swope
ATTORNEYS

Patented Nov. 4, 1952

2,616,335

UNITED STATES PATENT OFFICE 2,616,335

MOUNTING FOR REARVIEW MIRRORS

Ferdinand John Mazur, Natrona Heights, Pa., assignor to Libbey-Owens-Ford Glass Company, Toledo, Ohio, a corporation of Ohio Application November 26, 1947, Serial No. 788,268

3 Claims. (Cl. 88—98)

1

The present invention relates to rear view mirrors of the type commonly used in motor vehicles for observing rear road conditions by the driver, and particularly to an improved mounting therefor.

More especially, the invention is concerned with the provision of a mounting for a rear view mirror of the type having two reflecting surfaces arranged at an angle to each other so that, upon tilting of the mirror about a horizontal axis, the two surfaces may be alternately brought into position for use. One of these surfaces is a high reflective surface that is particularly suitable for use in day driving and the other surface is a low reflective surface particularly suitable for use in night driving. The two surfaces may either be the front and rear surfaces of a wedge shaped mirror or they may be surfaces formed on separate members arranged at any desired angle with respect to each other. By tilting the mirror slightly, the driver of an automobile can bring to his eyes either a bright or a dimmer and glare-free image of the same object.

One of the objects of this invention is the provision of a novel mounting for a rear view mirror of the above character embodying improved means by which the mirror can be tilted to selectively bring either the high reflective image or low reflective image into the line of vision of the driver, in combination with means permitting the mirror to be bodily adjusted to any desired angular position with respect to the tiltable mounting to accommodate persons of different height and seating position.

Another object of the invention is the provision of an improved mounting for a rear view mirror which enables the mirror to be readily and conveniently tilted upwardly and downwardly within a controlled arc to bring either the high reflective surface or the low reflective surface into the line of vision of the driver and held in such position in a positive manner.

A further object of the invention is the provision of an improved mounting for a rear view mirror embodying means for limiting the tilting movement of the mirror in either direction to give the desired intensity of image and for effectively locking it in such position.

A still further object of the invention is the provision of a special spring actuated snap locking means for effectively retaining the mirror in predetermined adjusted position while permitting it to be easily and quickly shifted to its other position by the driver with a minimum of effort and attention on his part and without disturb-

2 ing the adjustment of the mirror in relation to the driver.

Other objects and advantages of the invention will become more apparent during the course of the following description, when taken in connection with the accompanying drawings.

In the drawings, wherein like numerals are employed to designate like parts throughout the same:

Fig. 6 is a plan view of the tiltable mirror mounting;

Fig. 7 is a longitudinal sectional view therethrough taken in a horizontal plane;

Fig. 8 is a longitudinal sectional view taken substantially on line 8—8 of Fig. 6; and Fig. 9 is a perspective view of the two main parts of the mounting.

Figure 1:
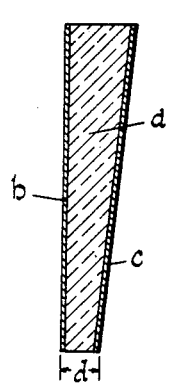
Fig. 1 is a vertical sectional view through a mirror made from a wedge shaped piece of glass.

By way of illustration, there is shown in Fig. 1, one form of mirror with which the improved mounting of this invention may be used and which consists of a piece of glass $a$ which is wedge shaped in vertical cross section. The back surface of the glass body $a$ carries a high reflective mirror film $b$, while the front surface carries a low reflective mirror film $c$ which is semi-transparent. The rear surface film $b$ is preferably opaque, although it may also be semi-transparent. However, if so, it is preferably of less transparency, and will of course be more highly reflective than the film $c$.

In using the prismatic mirror just described as a rear vision mirror in an automobile, it is desirable to employ it as a second surface mirror for daytime driving by viewing the rear road conditions as reflected from the high reflective film $b$; and to use it as a first surface mirror for nighttime driving by viewing the rear field of view as reflected from the lower reflective and substantially glare-free film $c$. With the novel mounting means of this invention, the mirror or reflective film from which it is desired to receive the image of the common limited rear field of view can be selected easily and quickly merely by tilting the mirror, as a whole, slightly in either a forward or rearward direction. This is due to the fact that the mirror films $b$ and $c$ are disposed at an angle relative to each other. This angle is sufficient to permit the image in either film to be made visible to the driver as a separate image independent of the image in the other film upon proper positioning of the prism mirror. For satisfactory separation of the two images at the usual distance of the automobile driver's eyes from the rear view mirror, so that only one image is apparent, it has been found that the angle $d$ between the two mirror surfaces, as shown in Fig. 1, preferably should be of the order of three and one-half degrees, although a deviation between the two surfaces of from two to ten degrees can be used.

Figure 3:
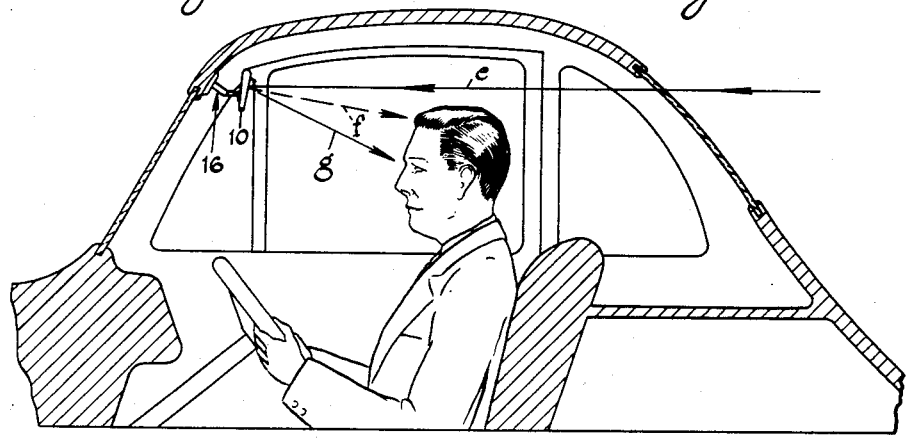
Fig. 3 is a diagrammatic view showing how the mirror is used in an automobile.

In using this mirror, the light beams from the rear field of view will enter the mirror, through the rear window of the automobile, along the line $e$ as indicated in Fig. 3. The image of the object or objects will be formed in the mirror and will be reflected therefrom. Reflection from the rear mirror surface $b$ will occur along the line $f$, while reflection from the front mirror surface $c$ will occur along the line $g$. By properly tilting the mirror, the lines $f$ and $g$ may be selectively brought to the level of the driver's eyes so that he will see either the image in surface $b$ or the image in surface $c$.

Figure 4:
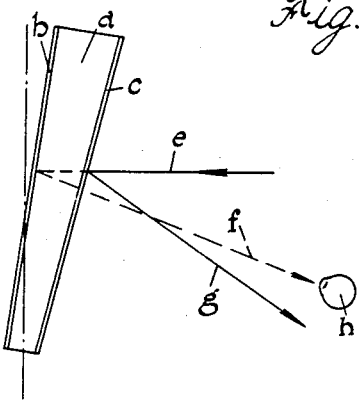
Fig. 4 is a diagrammatic view of the mirror showing how it is used for day driving.

Thus, as shown in Fig. 4, in the use of the mirror under day driving conditions, the image or field seen by the driver is reflected from the second or back surface $b$ of the mirror. To accomplish this, the light from the field or image travels along line $e$ through the semi-transparent mirror film $c$, as it comes into the glass, and again, after reflection at the mirror surface $b$ (disregarding refraction) it comes out through this same film along line $f$. Due to the position of the mirror at this time, line $f$ will be at the level of the driver's eyes $h$. A similar image will be reflected from the semi-transparent mirror film $c$, but this will be directed along line $g$ to a point below the eyes of the driver.

Figure 5:
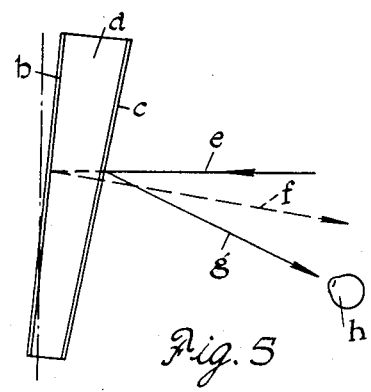
Fig. 5 is a similar view showing how the mirror is used for night driving.

However, if the mirror is tilted forwardly three and one-half degrees approximately to the slightly different position shown in Fig. 5, it will be suitable for night driving. In this position, incident light entering the mirror along line $e$ will be reflected from the front surface $c$ along the line $g$ which, due to the new position of the mirror, will be at the level of the driver's eyes $h$. Light will also enter the mirror through front film $c$ and will be reflected from the rear film $b$ along the line $f$ (disregarding refraction) but the line $f$, in the new position of the mirror, will be above the level of the driver's eyes $h$. Consequently, with the mirror tilted in this manner, the driver will see only the image reflected in film $c$.

The particular construction of the mirror and composition of the mirror films or coatings $b$ and $c$ per se form no part of the present invention, but by way of example may be of the type fully disclosed in the patent to W. H. Colbert, No. 2,397,947. Or, if desired, the back surface of the mirror may be silvered in the usual manner and the front surface left bare or uncoated.

Figure 2:
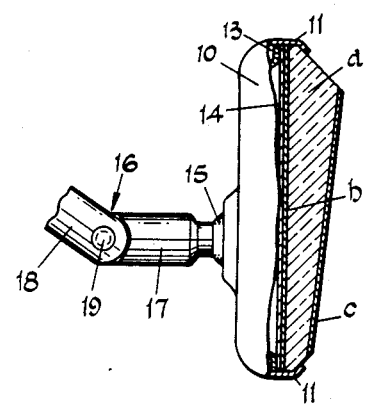
Fig. 2 is a similar view showing the mirror mounted in a frame and carried by the tiltable mounting means provided by this invention.

According to this invention, the mirror of Fig. 1 is carried by a metal backing plate or case 10 having an open side in which the mirror is arranged and held against forward displacement by the peripheral flange 11 of said case which is bent over the edges of the mirror as best shown in Fig. 2. To hold the mirror against rearward displacement, there is arranged within the case 10 a metal liner plate 12, the flanged peripheral edge 13 of which engages the back of the mirror. If desired, a protective sheet or layer 14 of paper or other suitable material can be interposed between the back of the mirror and the liner plate.

To provide for mounting the mirror in a vehicle so that it may be adjusted to properly position it for different drivers, it is carried on the truncated ball 15 of the improved tiltable mounting designated in its entirety by the numeral 16, said mounting comprising generally the two arms 17 and 18 pivotally connected together at their adjacent ends by a horizontal pivot pin 19 as will be more fully hereinafter described.

The ball 15 extends through an opening 20 in the case 10 and is mounted in a spherical seat or bearing 21 formed in the liner plate 12 in alignment with opening 20. The ball is held in its seat by a metal strap 22 having a central bearing portion 23 conforming to and engaging the ball and secured at its opposite ends to the liner plate as indicated at 24 and 25.

Extending rearwardly from the flattened side of the truncated ball 15 is a reduced stem 26 integral with the cylindrical arm 17 of tiltable mounting 16. The arm 17 is formed at its opposite end with a flattened head 27 which is vertically disposed and located intermediate the opposite sides of the arm to provide the arcuately curved end edges 28 and 29. The head 27 is provided centrally thereof with an opening 30 for the pivot pin 19. Formed integral with the head 27 is a finger 31 which is eccentric to the longitudinal axis of the arm 17 and has the forwardly converging upper and lower surfaces 32 and 33 terminating in a relatively sharp edge 34.

The arm 18 is also preferably cylindrical and is provided with an axial chamber 35 closed at one end and open at its opposite end. Extending forwardly from the open end of the chamber are the spaced parallel ears 36 and 37 which are disposed at opposite sides of the head 27 and have openings 38 which register with the opening 30 in said head to also receive the pivot pin 19 therethrough whereby the arms 17 and 18 are hingedly connected together. The forward end edges 39 and 40 of ears 36 and 37 are curved to correspond to the curvature of the end edges 28 and 29 of arm 17 to facilitate the desired swinging movement of the arm 17 relative to arm 18.

Freely mounted within the chamber 35 is a spring actuated snap lock comprising a locking ball 41 backed by a coil spring 42 which normally urges the ball 41 toward and maintains it in engagement with the end of the finger 31. The arm 18 terminates at its rear end in a threaded stud or the like 43 by which the mounting may be fixedly secured in position in the automobile, although other types of securing means may of course be provided. In order to prevent any undesirable play or vibration between the arms 17 and 18, there may be provided a metal washer 44 carried by the pivot pin 19 and positioned between the head 27 and one of the ears 36 or 37 of arm 18.

The finger 31 extends into the chamber 35 and is slightly narrower, in its direction of rotation, than the diameter of said chamber so that a limited play is provided between said finger and the internal wall of the chamber. This permits the required movement of the arm 17 through a predetermined arc necessary to bring either the primary image or the secondary image in the mirror into the eyes of the driver of the automobile. As pointed out above, the movement of the arm 17 around the axis of pivot pin 19, which is necessary to bring the desired image into the line of vision of the driver, is preferably substantially three and one-half degrees. The wall of the chamber 35, which is engageable by the upper or lower edge of the finger 31 depending upon the direction of movement of the arm 17, provides a positive step for limiting the movement thereof.

When the mirror is tilted upwardly or downwardly to the desired position for either daytime driving or nighttime driving, the ball 41 and spring 42, acting upon finger 31, function to effectively lock the mirror in place and thereby insure maintenance of the proper set position thereof. Thus, when the mirror is tilted upwardly for nighttime driving, as shown in full lines in Fig. 8, the finger 31 will be moved downwardly to engage the wall of the chamber 35 and thereby limit the movement of the mirror. At the same time, the edge 34 of finger 31 will move slightly beyond the center point of the ball 41 whereupon the spring 42 will urge the ball forwardly and maintain it in firm engagement with the surface 32 of the finger and thereby lock the mirror in set position.

When the mirror is tilted downwardly for daytime driving, as indicated in broken lines in Fig. 8, the finger 31 will be moved upwardly with the extent of its movement being limited by the wall of chamber 35. During such movement, the ball 41 will be temporarily forced rearwardly but as the edge 34 of the finger 31 moves beyond the center of the ball, the said ball will be instantly urged forwardly into engagement with the lower surface 33 of said finger to lock the mirror in position.

It will therefore be seen that upon tilting of the mirror first in one direction and then the other, the ball 41 is constantly held in engagement with the finger 31 by spring 42, and as the edge 34 thereof moves beyond the center of the ball, the said ball will instantly snap into engagement with the respective surface 32 or 33 directly behind the edge 34. Thus, there is provided a spring actuated snap lock with the ball 41 snapping into place first at one side and then the other side of the edge 34 of the finger 31 as the mirror is tilted upwardly or downwardly.

In use, the mirror is first adjusted upon the supporting ball 15 to the proper angular position for the driver of the automobile, after which the mirror is tilted upon the horizontal axis defined by the pivot pin 19 to selectively bring either the dim, glare-free image or the bright image to his eyes. The tilting of the mirror can be easily and quickly effected with the exercise of little or no care or attention on the part of the driver since the novel mounting herein provided will not only limit further movement of the mirror when it is moved to its extreme position in either direction but will also effectively lock it in such position. Likewise, the tilting of the mirror will in no way affect the adjustment of the mirror on the ball 15 to suit the particular driver. The strength of the spring 42 is such that it will hold the mirror firmly in selected position. Nevertheless, relatively little pressure is required to tilt the mirror against the action of the spring pressed ball 41 and move the edge 34 of the finger from one side of the center of the ball to the other. Once the finger has passed the center line, the spring pressed ball will actually assist the tilting movement and literally snap the finger into place against the wall of the chamber 35. It is only necessary that the driver swing the mirror upwardly or downwardly to its extreme position and the mounting will automatically function to limit the movement of the mirror when it reaches the required angle and insure its maintenance in such position until again changed by the driver.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What is claimed is:

1. In a two-position rear view vehicular mirror, a pair of supporting arms arranged end to end and pivotally connected together at their adjacent ends for movement relative to one another about a substantially horizontal axis, one of said arms adapted to be fixedly secured to a rigid part of the vehicle, a mirror carried by the other arm and movable relative to said first arm about said axis to produce two separate individual images of different light intensities, each of which images is selectively movable into the driver's field of vision by tilting of said mirror, one of said arms being provided with an axial chamber and the other with a finger extending into the open end of said chamber and terminating in a relatively sharp edge, a locking ball in said chamber, and a spring also in said chamber in back of said ball for constantly urging it toward the finger and for maintaining said ball in yieldable engagement with said finger at either one side or the other side of the relatively sharp edge upon angular adjustment of the movable arm and mirror carried thereby to maintain the mirror in either one of the two selected angular positions.

2. In a two-position rear view vehicular mirror, a pair of supporting arms arranged end to end and pivotally connected together at their adjacent ends for movement relative to one another about a substantially horizontal axis, one of said arms adapted to be fixedly secured to a rigid part of the vehicle, a mirror carried by the other arm and movable relative to said first arm about said axis to produce two separate individual images of different light intensities, each of which images is selectively movable into the driver's field of vision by tilting of said mirror, the first arm being provided with an axial chamber open at its inner end and terminating in a pair of spaced ears, a flattened head provided at the adjacent end of the second arm and received between said ears, a horizontal pivot pin passing through said ears and head, said head being formed with a finger extending into the open end of said chamber and terminating in a relatively sharp edge, a locking ball freely mounted in said chamber, and a spring also in said chamber maintaining the ball in yieldable engagement with the finger, said finger being relatively narrower than the diameter of the chamber in the direction of rotation of said second arm to provide for movement of the finger within said chamber to bring the relatively sharp edge thereof to a position at either side of the center of the ball to maintain the mirror in either one of the two selected angular positions.

3. In a two-position rear view vehicular mirror, a pair of supporting arms arranged end to end and pivotally connected together at their adjacent ends for movement relative to one another about a substantially horizontally axis, one of said arms adapted to be fixedly secured to a rigid part of the vehicle, a mirror carried by the other arm and movable relative to said first arm about said axis to produce two separate individual images of different light intensities, each of which images is selectively movable into the driver's field of vision by tilting of said mirror, the first arm being provided with an axial chamber open at its inner end and terminating in a pair of spaced ears, a flattened head provided at the adjacent end of the second arm and received between said ears, a horizontal pivot pin passing through said ears and head, said head being formed with a finger which extends into the open end of said chamber and terminates in a relatively sharp edge formed by the forwardly converging upper and lower surfaces of said finger, the movement of said second arm being limited by engagement of said finger with the wall of said chamber, a locking ball freely mounted in said chamber, and a spring also in said chamber maintaining the ball in yieldable engagement with the finger, said finger being relatively narrower than the diameter of the chamber in the direction of rotation of said second arm to provide for movement of the finger within said chamber to bring the locking ball into engagement with either of the forwardly converging surfaces of the finger to maintain the mirror in either one of the two selected angular positions.

FERDINAND JOHN MAZUR.

REFERENCES CITED

The following references are of record in the file of this patent:

UNITED STATES PATENTS

| Number | Name | Date |
|---|---|---|
| 903,499 | Pierce | Nov. 10, 1908 |
| 1,382,783 | Howard | June 28, 1921 |
| 1,883,287 | Zink | Oct. 18, 1932 |
| 2,256,763 | Reed | Sept. 23, 1941 |
| 2,307,532 | Murphy | Jan. 5, 1943 |
| 2,325,615 | La Hodny et al. | Aug. 3, 1943 |
| 2,420,259 | McNamara | May 6, 1947 |